No. 662,977. Patented Dec. 4, 1900.
C. F. SCHMELZ.
INSTRUMENT FOR DETERMINING MEASUREMENTS.
(Application filed July 5, 1899.)

(No Model.) 2 Sheets—Sheet 1.

Witnesses:
Henry Bissell
Geo. F. Hoffman

Inventor:
Charles F. Schmelz,
By his Attorney
F. H. Richards

No. 662,977. Patented Dec. 4, 1900.
C. F. SCHMELZ.
INSTRUMENT FOR DETERMINING MEASUREMENTS.
(Application filed July 5, 1899.)

(No Model.) 2 Sheets—Sheet 2.

Witnesses:
Henry Bissell
Geo. H. Hoffman.

Inventor:
Charles F. Schmelz,
By his Attorney
F. H. Richards.

UNITED STATES PATENT OFFICE.

CHARLES F. SCHMELZ, OF HARTFORD, CONNECTICUT, ASSIGNOR OF ONE-HALF TO FRANCIS H. RICHARDS, OF SAME PLACE.

INSTRUMENT FOR DETERMINING MEASUREMENTS.

SPECIFICATION forming part of Letters Patent No. 662,977, dated December 4, 1900.

Application filed July 5, 1899. Serial No. 722,800. (No model.)

*To all whom it may concern:*

Be it known that I, CHARLES F. SCHMELZ, a citizen of the United States, residing in Hartford, in the county of Hartford and State of Connecticut, have invented certain new and useful Improvements in Instruments for Determining Measurements, of which the following is a specification.

This invention relates to instruments for determining measurements, and has for one object the provision of a device which may be advantageously employed by engineers and artisans in general for the purpose of determining distances and angles or the trigonometrical functions of geometrical figures without rendering it necessary to make a graphic "lay-out" of the same or to make mathematical calculations with the aid of the usual tables provided for that purpose.

Another object of my invention is to so arrange the instrument that artisans and mechanics may be enabled to adjust the same proportionately to different distances, as will hereinafter appear, thus providing a convenient and practical tool which will be useful in many ways and which may be manufactured in various styles, according to the requirements of the user.

Figure 1:
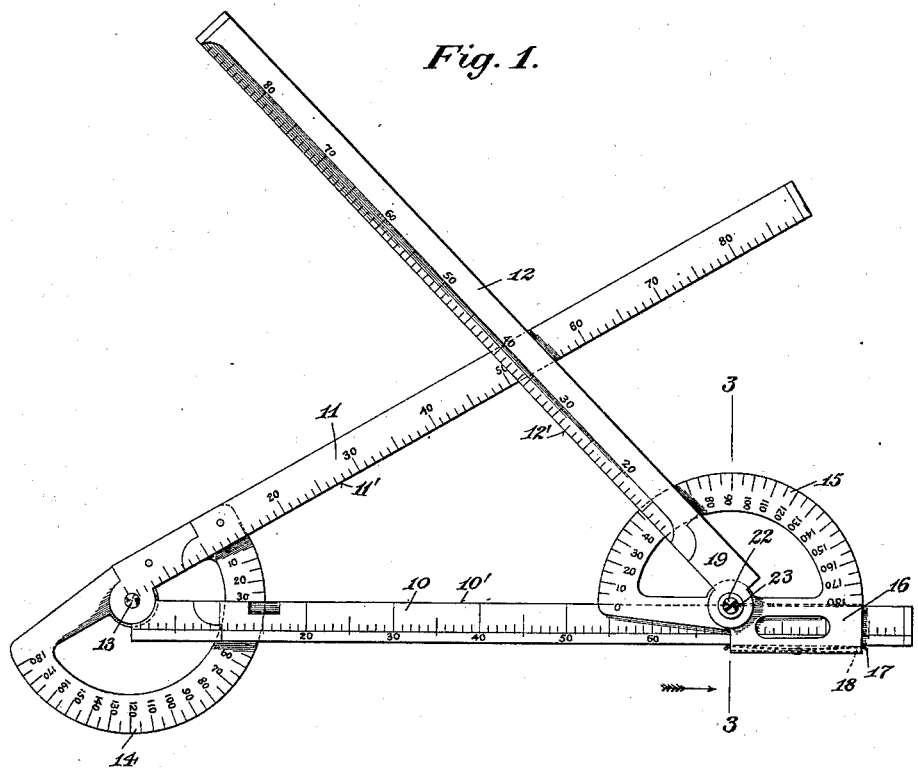
Figure 2:
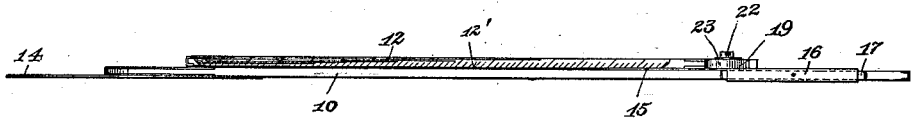
Figure 3:
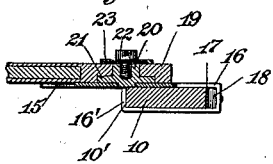

In the drawings, Figure 1 represents the instrument partially opened. Fig. 2 is an edge view of the same. Fig. 3 is a section on line 3 3, Fig. 1, and Figs. 4 to 6, inclusive, are diagrams illustrating the manner in which the instrument is employed for determining the trigonometrical functions of a triangle.

Similar characters designate like parts in all the figures of the drawings.

As above stated, the principal object of my invention is the provision of a tool for determining trigonometrical functions, the application of which to the mechanic arts is very extensive, but the theory of which is understood to a comparatively small extent by the very people who make the most practical use of the same. For this reason the engineer or draftsman has to be depended upon to supply figures and dimensions which are really the absolute results of mathematical calculations based upon predetermined angles or distances—elements which will permit of only one certain result for any one unknown function. The average workman is not sufficiently familiar with trigonometry, geometry, and algebra to be able to make mathematical calculations of the sides of a triangle relatively to the opposite angles, or vice versa, and for this reason the instrument forming the subject of my invention is so constructed that every element or function of any triangle may be read at a glance and without any figuring or calculating whatsoever. To this end the instrument in its simplest form consists of three bars 10, 11, and 12, which for the sake of convenience are graduated with units to form scales. The scales 10 and 11 are shown hinged or pivoted one on the other by a pivot-pin 13, the axis of which is located exactly on line with both the edges 10' and 11' of the scales 10 and 11, respectively, and forms the zero-point of the graduations thereof. A protractor 14 is secured to one of said scales—in the present instance to the one designated by the numeral 11—and has its center coincident with the axis of the pivot-pin 13, so that the angular deflection between the edges 10' and 11' may be properly read or determined, the zero-mark of the protractor being in alinement with or formed by the edge 11'. The third scale (designated by 12) is pivotally held on the scale 10 and turns on a pivot or axis located on a line with the edge 10' thereof, and a protractor 15, having its zero-mark on line with the edge 10', is provided for determining the angle of deflection between said scales 10 and 12, while the graduation of the scale 12 is indexed as having the zero-mark on the pivot-axis.

Figure 4:
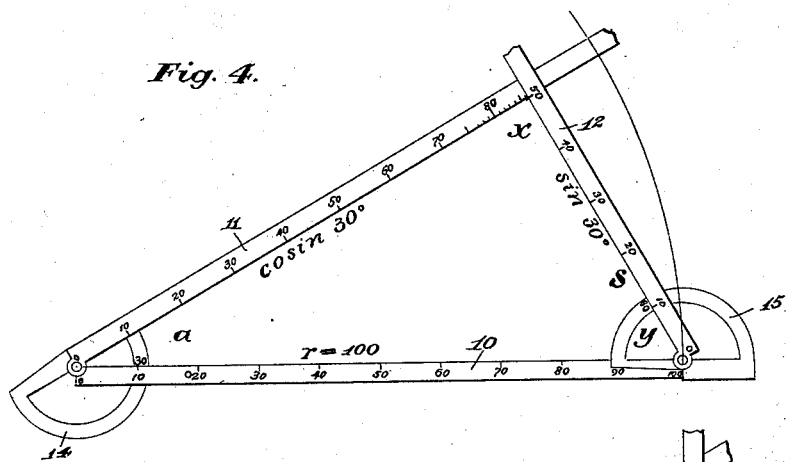
Figure 5:
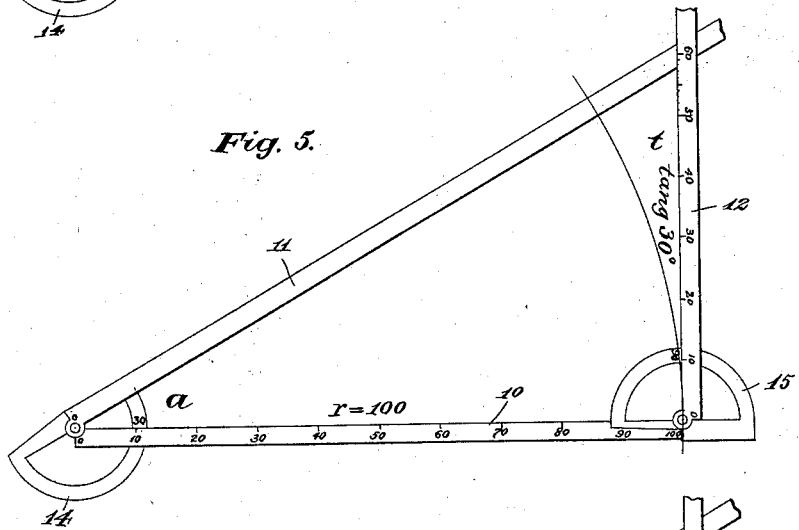
Figure 6:
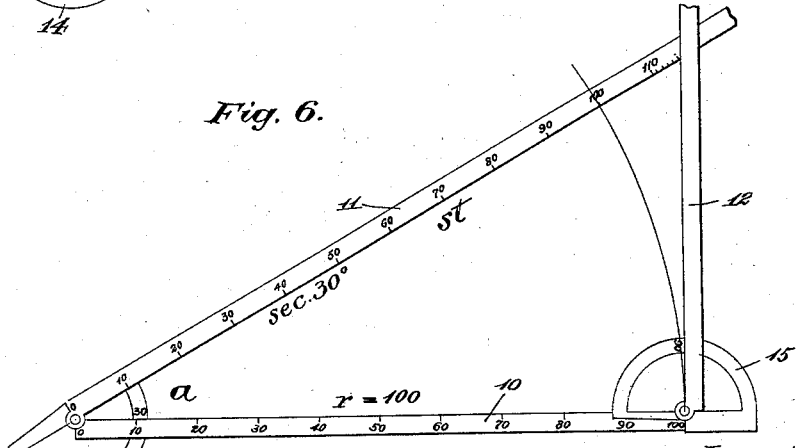

In Figs. 4 to 6, inclusive, of the drawings are shown diagrams of the instrument as set for determining various trigonometrical functions, the distance between the pivot-points of the scales being fixed at one hundred units and being equal to the radius $r$ of a circle, the center of which forms one point of a triangle to be calculated.

Fig. 4 illustrates one manner of arranging the instrument for determining the natural sine of the angle $a$, representing thirty degrees, s designating the required distance, the formula being sin. $a = s:r$. As the angle $x$ is ninety degrees and inasmuch as the angle $a$ has been fixed upon as being thirty degrees, the angle $y$ will of course be $180 - (a + 90) = 180 - (120) = 60°$. The instrument is therefore set with the angle $y = 60°$, the graduations of the scales showing sin. $a = 50$ (on scale 12) and cosin. $a = 86$ (on scale 11).

In Fig. 5 is illustrated the manner of obtaining the tangent $t$ of the angle $a$, which, for example, may be fixed at thirty degrees. The formula is tang. $a = t:r$. $r$ being one hundred units, $t$ will be found to read "57."

In Fig. 6 the secant is designated by $st$ and the angle $a$ is fixed at thirty degrees. The formula is sec. $a = st:r$. $r$ being one hundred units, $t$ will be found to read "115."

It will of course be understood that when the distances are given the instrument may be equally well employed for determining the angles corresponding therewith, and it will also be understood that the several sides and angles of a triangle may be readily determined, even if such triangle should not have a right angle for one of its elements.

It is the aim of this invention to incorporate the principles of the trigonometrical functions above mentioned in a tool adapted for use by artisans and mechanics generally, and for this reason the scale 12 is pivoted in the manner described on a slide 16 to permit of an adjustment of the distance between the pivots to correspond with the work in hand.

In the drawings the protractor 15 forms a part of the slide 16, and the parts are preferably made of sheet metal. The slide is bent to a shape to fit around the scale 10, the axis of the scale 12 being so located that it will always be in alinement with the edge 10' of said scale 10 and the bent portion 16' being adapted to engage the said edge. A spring 17 is carried by the slide 16 and placed within a space 18 provided therefor, and it serves to retain said bent portion 16' in sliding contact with the edge 10' and frictionally to hold said slide in its adjusted position.

The preferred construction of the pivot-joint of the scale on the slide 16 is clearly illustrated in Fig. 3, the scale 12 being provided with a metal butt 19, similar to that of an ordinary rule-joint, which is journaled on a stud 20, the base of which is enlarged, as at 21, to serve as a collar for retaining the stud in proper position on the butt, while the portion of the stud at one side of the base 21 may be riveted within the plate $16^2$ of said slide or otherwise secured thereto, and a screw 22 and washer 23 serve for holding the parts in position. By this construction the parts may be held in the desired frictional engagement, the screw 22 serving as a ready means for regulating the pressure contact, so that the scale 12 will be retained in any position to which it may be set.

The purposes for which a tool of this character is advantageously adapted are manifold, the following illustrating an instance in which a carpenter is enabled to determine without calculation the required measurements. Let it be supposed that a carpenter is instructed to build a roof-frame for a house sixty-nine feet wide and that the pitch of the roof shall be thirty degrees and forty-seven degrees, respectively. Then the tool will be adjusted as in Fig. 1 of the drawings and he will be enabled to read at a glance what lengths the rafters must have to conform to these conditions—viz., thirty-five and three-fourths feet on the steep pitch and fifty-one feet on the other. If the lumber should be somewhat short, he may set the tool until the lengths indicated by the scales agree with the measurements of the stock, and he will thus be enabled to read on the protractors what the respective pitches will be and saw the joints correspondingly. If he wishes to know what the length of a perpendicular stud under the ridge-pole must be, the scale 12 will be swung around its pivot until the ninety-degree mark on the protractor 15 is on a line with the edge 12' and the slide 16 is then moved toward the left bodily until the edge 12' intersects the point "51" of the scale 11, when he can read the required distance on the scale 12, the instrument thus representing the framing in miniature.

In the instances just enumerated each of the scale-units has been considered as representing one foot in actual practice; but it will be understood that the units may be representatives of any other measurement.

As will be observed, the slide 16, carrying protractor 15, may be moved along the straight-edge 10 until said protractor 15 overlaps the protractor 14, and the latter, being pivoted to the straight-edge, may be adjusted over the protractor 15, thus providing an additional means for making calculations and obtaining measurements. Both protractors are graduated, and as one may be swung over the other when the parts are in the positions just described the desired result may be accomplished. Furthermore, the parts may be packed in this manner in a compact form for transportation.

Many changes may be made in the construction and assemblage of the several elements constituting my improved instrument illustrated without departing from the scope of my invention—as, for instance, in some cases it may not be considered essential to have the bar upon which one of the scales is slidably mounted made in the form of a scale, in which case, however, the other two bars should be scales in order to adapt the instrument to the purposes for which it is intended.

The term "scale" as employed herein does not imply that the bars must necessarily have graduations thereon. The graduations are put on the bars for the sake of convenience and to avoid the necessity of employing a separate rule or scale for the purpose of measuring and setting off the distances between the operative points.

Having thus described my invention, I claim—

1. An instrument for determining measurements consisting of a graduated straight-edge; a scale pivoted directly to said straight-edge and carrying a protractor, the pivot of said scale being on a line with one edge of the straight-edge and with the opposing edge of the scale; a third scale; a protractor having a slide bent to fit around the straight-edge, to which protractor the third scale is directly pivoted, the pivot being on a line with the opposing edges of the straight-edge and said third scale; and a spring for frictionally retaining the protractor-slide upon the straight-edge.

2. In an instrument for determining measurements, the combination, with a pair of scales one constituting a straight-edge, of a third scale; a sheet-metal protractor having an integral slide bent to fit around one of said scales; and a spring carried in the channel of the protractor-slide and serving to retain the same in frictional engagement with one of said scales.

3. In an instrument of the class described, the combination, with a graduated straight-edge consisting of a solid integral body, of a scale connected to one end of said straight-edge by a rule-joint, the axis of said joint being on a line with the edge of the straight-edge and with the edge of said scale; a third scale; a sheet-metal protractor having an integral slide bent to fit around the straight-edge and to which said third scale is pivoted with its axis on a line with the edges of said third scale and said straight-edge; and a spring located in the channel of the slide and bearing against the back of the straight-edge and adapted frictionally to hold the slide in engagement therewith.

CHARLES F. SCHMELZ.

Witnesses:
HENRY BISSELL,
GEO. H. HOFFMAN.